United States Patent [19]

Stemmle

[11] Patent Number: 4,920,421
[45] Date of Patent: Apr. 24, 1990

[54] SIMULTANEOUS READ/WRITE COPIER

[75] Inventor: Denis J. Stemmle, Webster, N.Y.

[73] Assignee: Xerox Corporation, Stamford, Conn.

[21] Appl. No.: 257,366

[22] Filed: Oct. 13, 1988

[51] Int. Cl.⁵ .................. H04N 1/024; H04N 1/23; G01D 15/16

[52] U.S. Cl. ............................ 358/296; 358/472; 358/483; 358/497; 358/498; 346/140 R

[58] Field of Search ............... 358/296, 300, 302, 285, 358/293, 286; 346/1.1, 107 R, 160, 140 R, 139 R

[56] References Cited

U.S. PATENT DOCUMENTS

| | | | |
|---|---|---|---|
| 4,424,524 | 1/1984 | Daniele | 346/160 |
| 4,476,496 | 10/1984 | Thaler | 358/296 |
| 4,496,984 | 1/1985 | Stoffel | 358/293 |
| 4,636,871 | 1/1987 | Oi | 358/296 |

Primary Examiner—Bruce A. Reynolds
Assistant Examiner—Scott A. Rogers
Attorney, Agent, or Firm—Ronald F. Chapuran

[57] ABSTRACT

A combined input and output scanner comprising in combination a stationary support for holding a document, a carriage system adapted for scanning movement in a first direction across the document and for indexing movement in a second direction transverse to the first direction, the carriage system scanning a band of information across the document and then indexing a first distance to scan another band of information across the document, a reading head rigidly secured to the carriage system for scanning the document to produce a digital image of the document, a copy sheet support, the copy sheet support indexing in said second direction to convey the copy sheet in the direction of indexing of the carriage system, said copy sheet being indexed a second distance in the direction of the index of the carriage upon the completion of each scan across the document, and a printing head rigidly secured to the carriage for relative movement with respect to a copy sheet and electrically connected to the reading head for printing said digital image on said copy sheet.

16 Claims, 4 Drawing Sheets

SIMULTANEOUS READ/WRITE COPIER

BACKGROUND OF THE INVENTION

The invention relates to a combination input and output scanner, and more particularly to a single scanning carriage incorporating a reading head and a printing head to permit substantially simultaneous reading and writing of a document original and copy thereof.

Historically, copies of document originals have been produced by a xerographic process wherein the document original to be copied is placed on a transparent platen, either by hand or automatically through the use of a document handler, and the document original illuminated by a relatively high intensity light. Image rays reflected from the illuminated document original are focused by a suitable optical system into a previously charged photoconductor, the image light rays functioning to discharge the photoconductor in accordance with the image content of the original to produce a latent electrostatic image of the original on the photoconductor. The latent electrostatic image so produced is thereafter developed by a suitable developer material commonly referred to as toner, and the developed image transferred to a sheet of copy paper brought forward by a suitable feeder. The transferred image is thereafter fixed as by fusing to provide a permanent copy while the photoconductor is cleaned of residual developer preparatory to recharging.

More recently, interest has arisen in electronic imaging where in contrast to the aforedescribed xerographic system, the image of the document original is converted to electrical signals or pixels and these signals, which may be processed, transmitted over long distances, and/or stored, are used to produce one or more copies. In such an electronic imaging system, rather than focusing the light image onto a photoreceptor for purposes of discharging a charged surface prior to xerographic development, the optical system focuses the image rays reflected from the document original onto the image reading array which serves to convert the image rays to electrical signals. These signals could be used to create an image by some means such as operating a laser beam to discharge a xerographic photoreceptor, or by operating some direct marking system such as an ink jet or thermal transfer printing system.

It is generally advantageous if the normally separate document reading and copy printing operations could be combined. If some of these reading/writing functions could be combined, system operation and synchronization could be simplified and system cost reduced through the use of fewer parts.

There are systems in the prior art that address the above identified concerns. For example:

U.S. Pat. No. 4,496,984 to Stoffel and U.S. Pat. No. 4,583,126, a division of the above-identified reference, disclose an input/output scanner for simultaneously reading a document and writing a copy. The document and copy sheet are fed in back to back relation to the read/write station. A monolithic full width reading array reads each line in two steps, to improve resolution. The writing array consists of rows of ink jet nozzles, of which the number and disposition is in direct correspondence to the sensors of the read bar.

U.S. Pat. No. 4,424,524 to Daniele discloses a full width read/write LED array for scanning a document in the read mode or exposing the photoreceptor in the write mode. A Selfoc optical fiber lens array is used for focusing the full width LED array on the document or photoreceptor.

U.S. Pat. No. 4,636,871 to Oi discloses a copying machine comprising separate reading and printing arrays and a scanning mechanism for moving the subject copy. A relative movement between the copying paper sheet and print element and between the document and read element is effected so that scanning is performed in the same pattern on both the reading and printing sides.

A difficulty with these prior art systems is the complexity and cost of separate components such as the complex optics, photoreceptor and developer in a typical xerographic process such as the Daniele system. In other systems such as the Stoffel system, it is necessary for an operator to manually combine a document and copy sheet into a single unit for manual insertion to the machine feed rolls. Such a system also has a significant cost penalty associated with components such as the monolithic full width reading array. It is an object of the present invention, therefore, to provide a new and improved read/write scanner/printer system in which a read head and print head are both substantially smaller and less expensive than a full width array component, and co-mounted on the same single scanning carriage to substantially simultaneously read a stationary document and print a copy on a copy sheet. It is another object of the present invention to provide a document that is read and a copy that is printed in a series of bands across the document and copy, that is, after each band of information is read and printed, the read and write components are indexed down the document and copy so that the next band of information can be read and printed.

SUMMARY OF THE INVENTION

The present invention is a combined input and output scanning system for reading pixel information off a document and printing it on a copy paper, comprising in combination a stationary support for holding a document, a first carriage adapted for scanning movement in either direction across the document said first carriage being mounted to a second carriage adapted for indexing movement in a second direction transverse to the first direction of said first carriage, a reading head rigidly secured to said first carriage for scanning a portion of the document on each scan across the document to produce a digital electronic image of a portion of the document, a copy sheet support mounted to said second carriage, the copy sheet support indexing with said second carriage in said second direction, said copy sheet also being indexed relative to the position of said second carriage in the direction of the index of said second carriage upon the completion of each scan across the document by said first carriage, and a printing head rigidly secured to the first carriage for relative movement with respect to a copy sheet and electrically connected to the reading head for printing said digital image on said copy sheet.

IN THE DRAWINGS

For a better understanding of the present invention, reference may be had to the accompanying drawings wherein the same reference numerals have been applied to like parts and wherein.

DESCRIPTION OF THE PREFERRED EMBODIMENT

Figure 1:
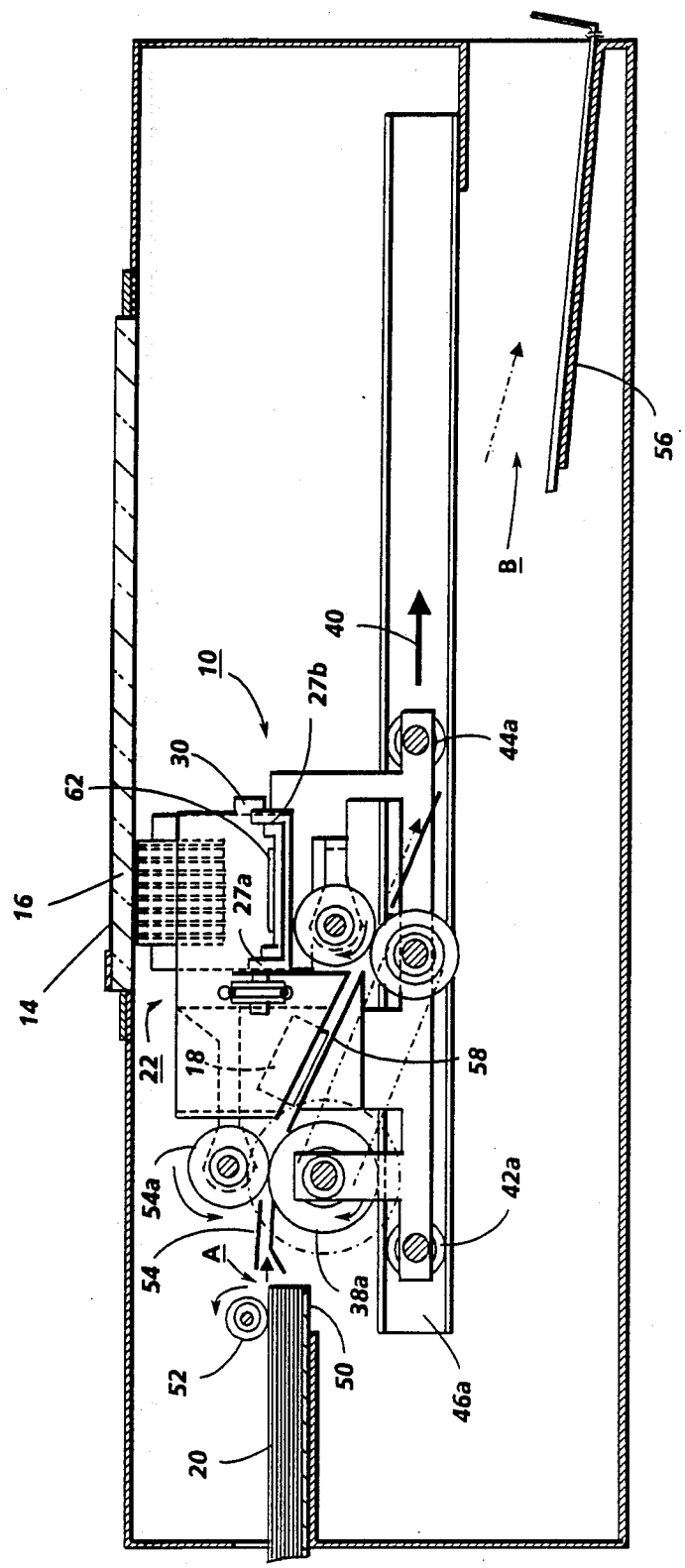
FIG. 1 is a side view of the combined input and output scanner of the present invention.
Figure 2:
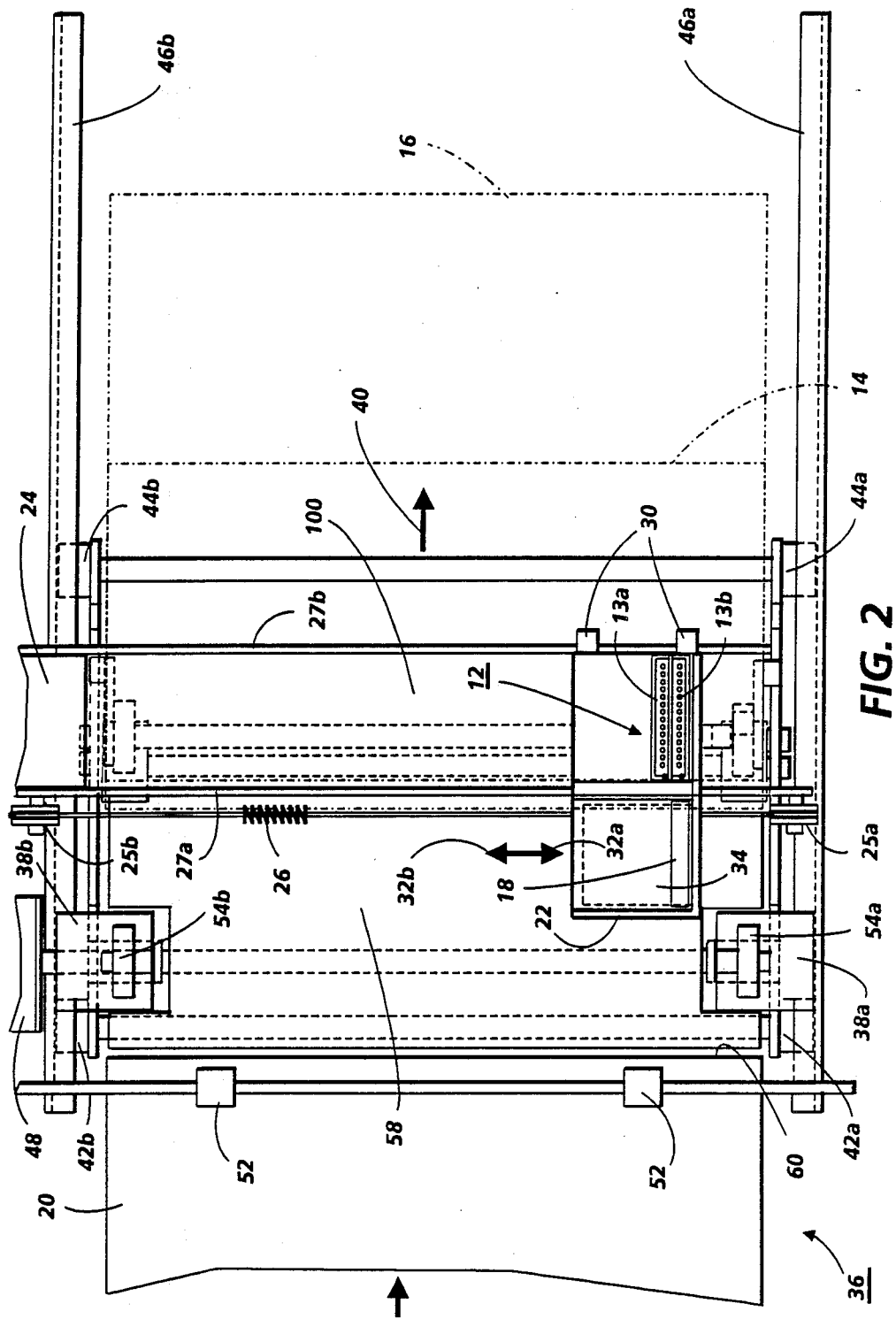
FIG. 2 is an isometric view of the scanner shown in FIG. 1

Referring to FIGS. 1 and 2 of the drawings, there is shown a combined input scanner and output scanner, designated generally by the numerl 10. For input scanning an image read assembly 12 is composed of an illuminator 13a, which may be an array of light emitting diodes (LEDs) or any other suitable illuminator, a lens 13b which may be a selfoc lens, and an input digitizing chip 62, which may be a charged coupled device (CCD) array or any other suitable device for receiving optical signals and converting them into electronic pixel information in a data register. This assembly scans or reads document originals 14 held or supported on platen 16, the document image areas scanned being converted to electric image signals or pixels.

While the image signals so produced may be output to a suitable memory, communication channel, printer, and the like, in a preferred embodiment, the image signals generated by the read head 12 are input to a print bar 18, which may be any suitable direct imaging device such as a thermal transfer head, or preferably a thermal ink jet array, to write copies of the document originals 14 in accordance with the image signals onto a suitable substrate or copy sheet 20. As will be understood the number of scanning elements or sensors that comprise image read bar 12 determine the initial scanning resolution while the number of ink jet nozzles that comprise print bar 18 determines the resolution of the image copy. In the preferred embodiment, the number of input scanning elements may equal the number of output printing elements.

In accordance with the present invention, both the scanning head and the print head are secured for movement on the same scan carriage generally illustrated at 22. As illustrated in FIG. 2, the input scanning assembly 12, including the LED illumination array 13a and the Selfoc lens 13b, and the CCD array 62, are secured to the carriage 22 for movement underneath the platen. Also mounted on the same scanning carriage is the thermal ink jet array or print bar 18 mounted for movement over the copy sheet 20.

The scan carriage 22 is driven by a scan drive motor 24 that is mechanically coupled to the scan carriage 22 via a drive pulley 25b connected to idler pulley 25a by a cable and spring arrangement illustrated at 26 for driving the scanning assembly 12 across a document on the platen 16 and at the same time driving the thermal ink jet array or print bar 18 across a copy sheet disposed underneath the ink jet array. The scan carriage 22 is suitably secured to the cable and spring arrangement 26 and is mounted to be guided along the scan guide rails 27a, 27b. A slot in the underside of scan carriage 22 accommodates the scan guide rail 27a for support thereof and a flange extension 30 of the scan carriage 22 engages the scan rail 27b for support of the scan carriage.

The scan motor 24, pulleys 25a and 25b, cable and spring arrangement, and scan guide rails 27a and 27b are all mounted to index carriage 100 such that scan carriage 22 can be driven back and forth across index carriage 100. In operation, the scan guide motor 24 drives the cable to pull the scan carriage 22 in a direction that is shown by the arrow 32a to an end of scan position at one edge of the document and copy sheet wherein the drive motor is stopped. The index carriage is then indexed a short distance in the transverse direction as described below, and then stops. The scan motor 24 then drives the scan carriage 22 in the reverse direction 32b in order to read the next band of information on the document 14 and copy it on the next band of the copy paper 20.

The LED array 13a, Selfoc lens array 13b, and CCD array 62 are suitably secured and supported on the top of the scan carriage 22 and the thermal ink jet array 18 is suitably secured and supported on the underside of the scan carriage. A suitable ink supply illustrated at 34 is fastened to the scan carriage near the thermal ink jet array 18.

The index carriage 100 including the scan motor 24 and drive system, and scan rails 27a, 27b are suitably mounted on indexing roll pairs 42a, 42b, 44a, 44b to move the scan carriage in the direction of arrow 40, the indexing roll pairs, extending between the rails 46a, 46b, the indexing rails being U-shaped channels and stabilizing the movement of the indexing assembly in the direction of arrow 40. The movement of the scan carriage in the direction of arrow 40 is guided by the engagement of rolls 42a, 42b, 44a, 44b within the channels of index rails 46a, 46b.

An index drive motor 48 mechanically conencted to drive rolls 38a, and 38b extending between the rails 46a and 46b is enabled to suitably index the indexing carriage supporting the scan carriage 22 in the direction of arrow 40 along the indexing rails, the rolls 38a, 38b supported on top of the rails 46a, 46b. Drive roll 38a is supported on top of rail 46a and roll 38b is supported on top of rail 46b. The other set of rollers, the idler rolls 38a and 38b serve to index copy sheets relative to carriage 100 in the direction of arrow 40 at the same time as the carriage 100 is indexed in the direction of arrow 40 relative to rails 46a and 46b. Thus, when index carriage 100 indexes relative to document 14 prior to scanning a new portion of the document, the copy paper is indexed the same distance relative to carriage 100, thus positioning the copy paper to receive copy information of said new portion of the document printed onto a new portion of the copy paper.

Figure 4:
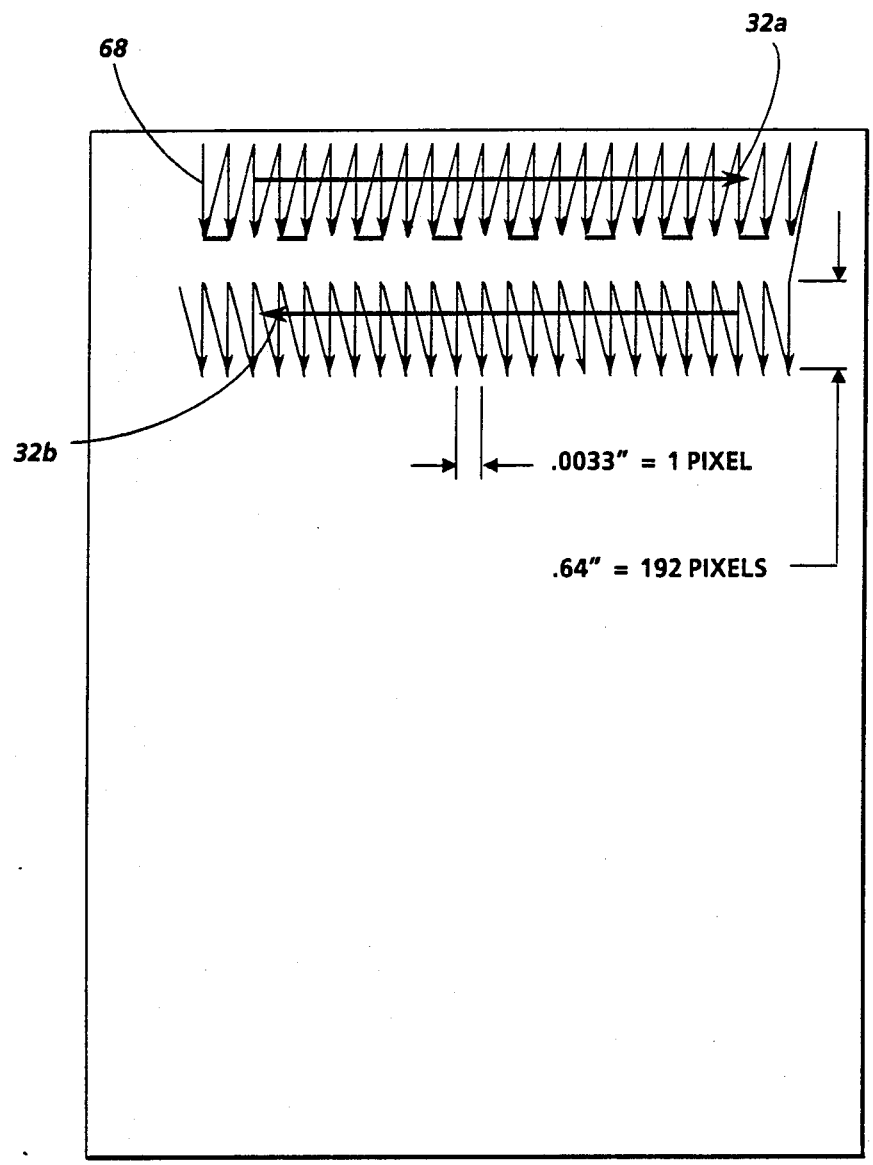
FIG. 4 is an illustration of the scaning operation.

The movement of the scan carriage 22 supporting image read asesmbly 12 and print bar 18 is further illustrated with respect to FIG. 4. Arrows 32a and 32b illustrate the forward and reverse scan of the carriage 22 across a document and copy sheet, also shown in FIG. 2. the arrows 68 illustrate that a number of pixels, perpendicular to the direction of movement of scan carriage 22, are both read by the scan assembly 12 and printed by the print bar 18 as the carriage scans the document and copy sheet. In a typical embodiment, 192 pixels are read and printed perpendicular to the movement of carrige 22 as it scans. The movement of the carriage 22 can be continuous or in discrete steps, but in a preferred embodiment, the 192 pixels are read and printed in increments that are one pixel apart as shown. In one embodiment, each time the scan carriage 22 moves a distance of one pixel width across the sheet, the electronic image of 192 pixels down the sheet are moved into a shift register and then amplified and shifted in reverse order into the print bar to fire the 192 ink jets and thereby create a print of the 192 pixels previously read. This sequence is repeated each time the scan carriage has moved a distance of one pizel width.

It should be noted that the scanning could also be done with 192 parallel channels, each channel reading and writing a single line of pixels as the carriage sweeps across the page.

It should also be noted that the read/write operation could either be substantially simultaneous or a digital buffer or register could be incorporated to initially store the scanned or read signals for later printing after a predetermined or arbitrary time period. It should also be understood that that combined scanner of FIGS. 1 and 2 could be operated independently as a printer modulated by any suitable device providing digital information, operated independently as a scanner to convert source documents to a digital representation, or operated as a copier by combining the scanning and printing operations.

With respect to FIG. 1, a suitable tray 50 provides copy sheets which are separated from the stack and advanced by suitable rolls 52 along a paper path illustrated by paper guide 54 to the nip of rolls 54a, 38a and 54b, 38b to be positioned underneath the print bar 18 on paper support 58. Upon completion of the printing operation, the copy sheet is output to a suitable output tray 56. In accordance with another feature of the present invention, the drive rolls 38a, 38b index the carriage 100 and the copy sheets after each scan of the scan carriage 22, advancing the indexing carriage 100 one sweep width with reference to the fixed document 14, and advancing the copy paper 20 one sweep width with reference to index carriage 100 prior to the scanning motion of the scan carriage 22. A sweep width is defined as the width of the band of information to be read from the document 14 and printed on the copy paper 20 during each scan of the scanning carriage across the document. The sweep width can be designed as any width from a minimum of a single pixel line to a maximum of the width of the entire document. In practical terms, in order to keep the cost of the read and write components low, the sweep width may be in the area of a fraction of an inch to several inches wide.

Figure 3:
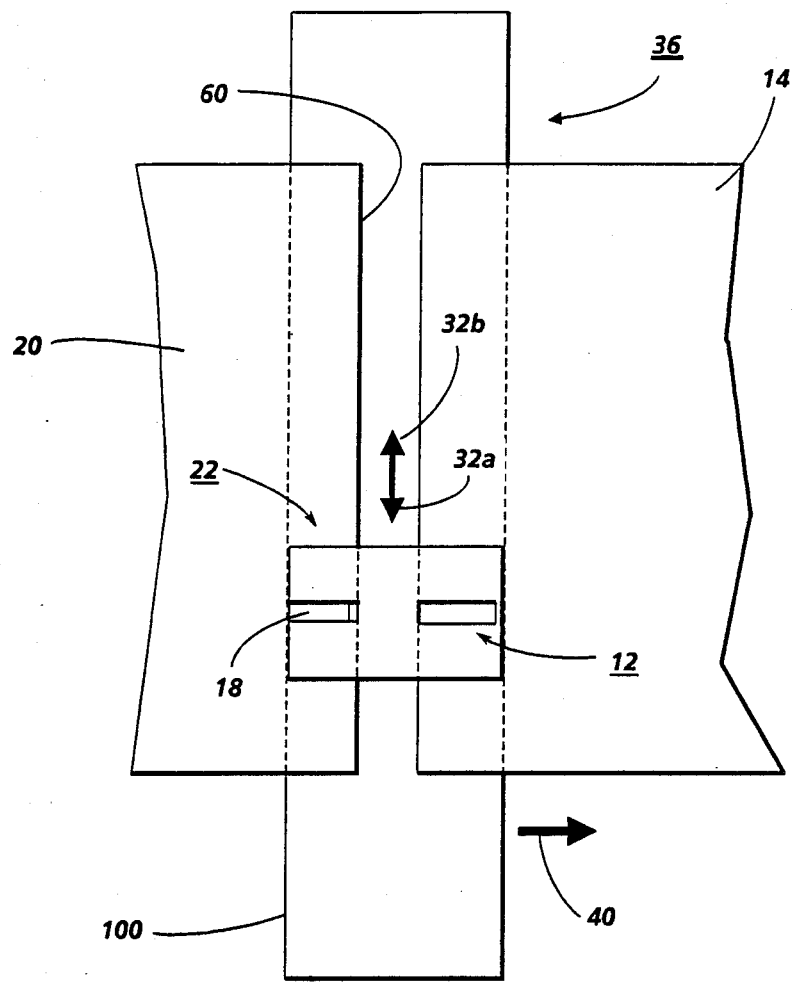
FIG. 3 is a top view showing details of the read and write bars of the present invention.

With reference to FIG. 3, the indexing carriage 100 is indexed in the direction of the arrow 56 one sweep width of the scan carriage 22 after each completion of a scan carriage cycle, the cycle being a sweep completely across the document 14 and copy sheet 20 as illustrated by arrow 32a or 32b. Thus, the indexing carriage 100 moves itself and the scan carriage 22 intermittently in the direction of the arrow 56 after which it stops moving in order to allow scan carriage to sweep across document 14 and copy paper 20 in order to read a band of information from document 14 and print it on copy paper 20. Also, illustrated is the lead edge 60 of the copy sheet 20 for receiving information from the print bar 18 as the scan carriage 22 traverses the width of the copy sheet. However, upon completion of a scan cycle of the scan carriage 22, the drive rolls 38a, 38b drive the indexing carriage 100 in the direction of arrow 56 for a distance of one sweep width while simultaneously driving the copy paper one sweep width relative to the index carriage 100. Therefore, after each indexing cycle, the read head mounted on carriage 22 has moved one sweep width relative to document 14, thus positioning itself to read a new portion of the document on the next scan across the document, and the copy paper has indexed one sweep width relative to print head 18, thus enabling the print bar to print the information being read by the read head on a new portion of the copy paper. Note that during each index cycle, the copy sheet 20 moves two times the distance of the carriage relative to the fixed document 14. Thus, a copy sheet can be inserted in one side of the machine paper path A, as shown in FIG. 1, and it exits the opposite side of the paper path at B. Thus, there is a completed copy delivered to catch tray 56 as soon as the last sweep of the scan carriage is made.

Figure 5:
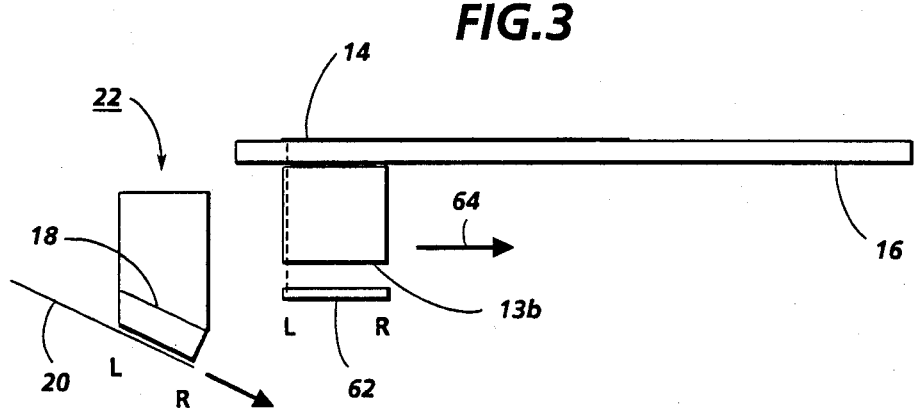
FIG. 5 is a side view of the details of FIG. 3.

In accordance with another aspect of the present invention, a line of information read on the left extreme of the image read bar 12 fires the print bar 18 on the right extreme of the print array during the scan of the carriage 22. This is, with reference to FIG. 5, there is illustrated an input chip 62, or some multiple of chips, which may contain in addition to the previously mentioned CCD array function any suitable data register or temporary store of digital pixel information, receiving input image information from document 14 through Selfoc lens 13b, to the CCD array on chip 62. The pixel data received by the input chip 62 by the image receiving element at the extreme left L of the chip, as illustrated, as the carriage 22 moves in the direction of arrow 64 is transmitted and amplified to modulate the print head 18 to fire the print head at the extreme right R of the print head. It should be noted that this scheme achieves right reading copies. That is, the reflection of the document image onto the copy sheet 20 is in a right reading orientation. In general, the information may be read and printed in bands ranging from a fraction of an inch to several inches depending on the width of the read and print heads as the scan carriage 22 sweeps across the fixed document 14. The copy sheet 20 and support rolls 42a, 42b, 44a, 44b are fixed during each sweep then indexed down the document after each scan is completed.

It should be noted with reference to FIG. 1, that the print head 18 is on a slight angle relative to the horizontal to provide an adequate supply of ink to the print head. Ink jets are known to drip if the full ink supply is more than $\frac{1}{4}$ to $\frac{1}{2}''$ higher than the tip of the head or the jets, but can draw ink from below by capillary action. Thus, by putting the jets on a slant, the capacity of the ink supply can be increased. It should also be noted, however, that it is not necessary to place the ink jet supply at an angle as shown and thus the copy sheet path could be horizontal from the copy sheet supply tray 50 to the output tray 56. Alternately, the ink supply could be located below the paper path and connected to the print head by an umbilical tube. It should also be noted that the scan head 12 can be adpated to read and print bidirectionally. With such an arrangement, the scan can alternate left to right then right to left with no additional memory required, provided that the system response time is sufficiently fast. By operating the read/write elements bidirectionally, the fly back time could be eliminated to enhance productivity. The read and write elements could also be placed side by side. Note, in a more sophisticated system in which electronic time delays are required after reading each pixel so that electronic image enhancement could be performed before firing the appropriate ink jet, unidirectional scanning may be required in order to avoid mispositioning copy pixels on subsequent sweeps due to the time delay.

Further advantages of the present invention will become apparant as the following description proceeds, and the features characterizing the invention will be pointed out with particularity in the claims annexed to and forming a part of this specification.

I claim:

1. In a system having a co-mounted unit of reading and printing elements, the method of making a copy of a document onto a copy sheet without information storage comprising the steps of:
   scanning the co-mounted unit across the document and copy sheet in a first direction,
   indexing the co-mounted unit a predetermined distance relative to the document and copy sheet in a second direction, and
   repeating the scanning and indexing motion relative to the document and copy sheet, said scanning element reading a portion of said document during said movements across said document, and said printing element printing a portion of a copy during said movement across said document wherein said reading and printing occur essentially simultaneously.

2. The method of claim 1 in which said motions across said document occur alternately in opposite directions.

3. A combined input and output scanner comprising in combination:
   a stationary support for holding a document,
   a first carriage adapted for scanning movement in a first direction across the document and mounted to a second carriage,
   said second carriage adapted for indexing movement in a second direction transverse to the first direction, the first carriage scanning a band of information across the document and the the second carriage indexing a distance substantially equal to the width of the band of information scanned so that the first carriage can scan a another band of information across the document,
   a reading head rigidly secured to said first carriage for scanning the document to produce a digital image of the document,
   a printing head rigidly secured to said first carriage for relative movement with respect to a copy sheet and electically connected to the reading head for printing said digital image on said copy sheet,
   a copy sheet support and copy sheet transport system both mounted to said second carriage, the copy sheet transport system adapted to index said copy sheet across said copy sheet support in said second direction upon the completion of each scan across the document.

4. The scanner of claim 3 wherein the distance indexed by the copy paper relative to the fixed document is twice the distance indexed by said second carriage relative to the fixed document.

5. The scanner of claim 4 wherein the digital image is printed on the copy sheet simultaneously with said scanning the document to produce said digital image.

6. A combined input and output scanner comprising in combination:
   a support for holding a document,
   a carriage system adapted for relative scanning movement in a first direction and for relative indexing movement in a second direction with respect to the document,
   a reading head rigidly secured to the carriage for scanning the document to produce a digital image of the document,
   a source of copy sheets, and
   a printing head rigidly secured to the carriage system for relative movement with respect to a copy sheet and electrically connected to the reading head for printing said digital image on said copy sheet, said reading and printing occurring essentially simultaneously.

7. The scanner of claim 6 wherein the document is stationary and the carriage moves relative to the document.

8. The scanner of claim 7 wherein the carriage scans a band of information across the document and then indexes a first distance before scanning another band of information across the document.

9. The scanner of claim 8 wherein said copy sheet is indexed a second distance in the direction of the indexed of the carriage system upon the completion of each line scan across the document, the second distance being greater than the first distance.

10. The scanner of claim 9 wherein the second distance is twice the first distance.

11. The scanner of claim 6 wherein the printing head is a thermal ink jet array an the digital image is printed on the copy sheet simultaneously with the scanning of the document to produce said digital image.

12. The scanner of claim 6 wherein the digital image on the copy sheet is a right reading image.

13. The scanner of claim 3 in which the band of information scanned from the document and printed on the copy paper is more than one pixel wide.

14. The scanner of claim 6 in which only the document scanning is operative to provide an input scanner.

15. The scanner of claim 6 in which only the copy paper printing is operative to provide an output printer.

16. The scanner of claim 6 including a variable time delay after each indexing movement in order to provide asynchronous operation.

* * * * *